United States Patent [19]
Piket et al.

[11] Patent Number: 5,721,782
[45] Date of Patent: Feb. 24, 1998

[54] PARTITIONED ECHO CANCELER UTILIZING DECIMATION ECHO LOCATION

[75] Inventors: James Brian Piket, Gilbert; Daryl Leslie Bergstrom, Mesa; William Chunhung Yip, Scottsdale, all of Ariz.

[73] Assignee: Motorola, Inc., Schaumburg, Ill.

[21] Appl. No.: 621,788

[22] Filed: Mar. 25, 1996

[51] Int. Cl.$^6$ ............................................. H04B 3/20
[52] U.S. Cl. .................. 381/66; 381/94; 364/724.19; 379/410
[58] Field of Search .......................... 381/66, 61, 94, 381/93, 71; 364/724.19; 455/411, 410

[56] References Cited

U.S. PATENT DOCUMENTS

| | | | |
|---|---|---|---|
| 5,084,865 | 1/1992 | Koike | 379/411 |
| 5,136,577 | 8/1992 | Amano et al. | 379/411 |
| 5,272,656 | 12/1993 | Genereux | 364/724.19 |
| 5,305,307 | 4/1994 | Chu | 381/71 |
| 5,638,439 | 6/1997 | Kawada et al. | 379/411 |

FOREIGN PATENT DOCUMENTS

| | | | |
|---|---|---|---|
| 4231309 | 3/1994 | Germany | 364/724.19 |
| 2240452 | 7/1991 | United Kingdom | 381/60 |

Primary Examiner—Curtis Kuntz
Assistant Examiner—Xu Mei
Attorney, Agent, or Firm—Bradley J. Botsch, Sr.

[57] ABSTRACT

The present invention includes an adaptive filter (40) for use within an echo canceler. The adaptive filter operates in a first mode for performing Decimation Echo Location (DEL). During the DEL mode, high energy regions occurring within the echo impulse response are identified over an extended time range through signal decimation. The adaptive filter then operates in a second mode for performing Partitioned Echo Cancellation (PEC). During the PEC mode, filter coefficients not associated with these high energy regions are modeled as zero while the identified high energy region filter coefficients of the impulse response are partitioned and convolution of the reference signal, x(n), with the impulse response signal, h(n), is accomplished by performing convolution on only those samples in the reference signal memory block (50) that correspond to respective high energy region filter coefficients in the adaptive filter block (56). Accordingly, the adaptive filter of the present invention extends the tail length time range of conventional adaptive filters while not increasing the number of required filter coefficient taps and substantially reduces the number of convolution multiply accumulate operations and coefficient update calculations required for performing echo cancellation over the extended time range.

8 Claims, 3 Drawing Sheets

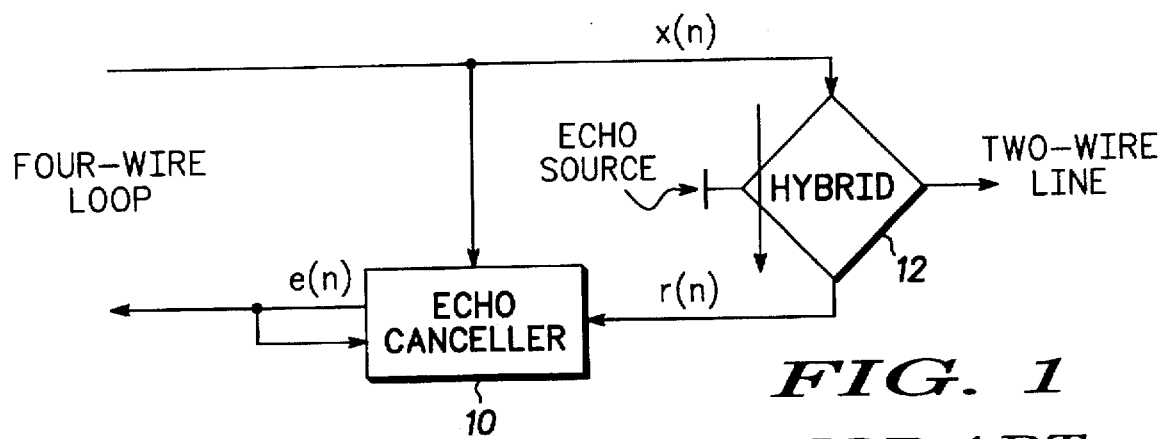
FIG. 1
*- PRIOR ART -*
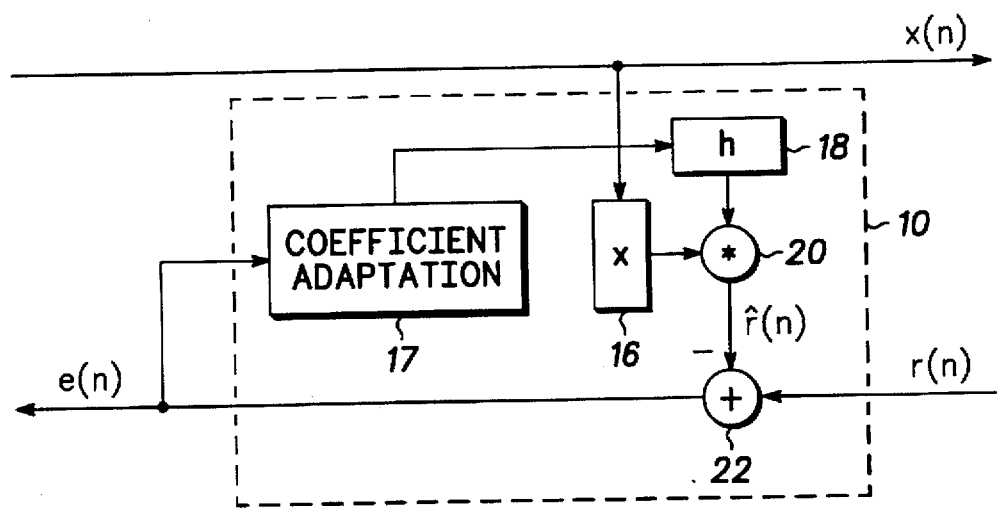
*- PRIOR ART -* FIG. 2

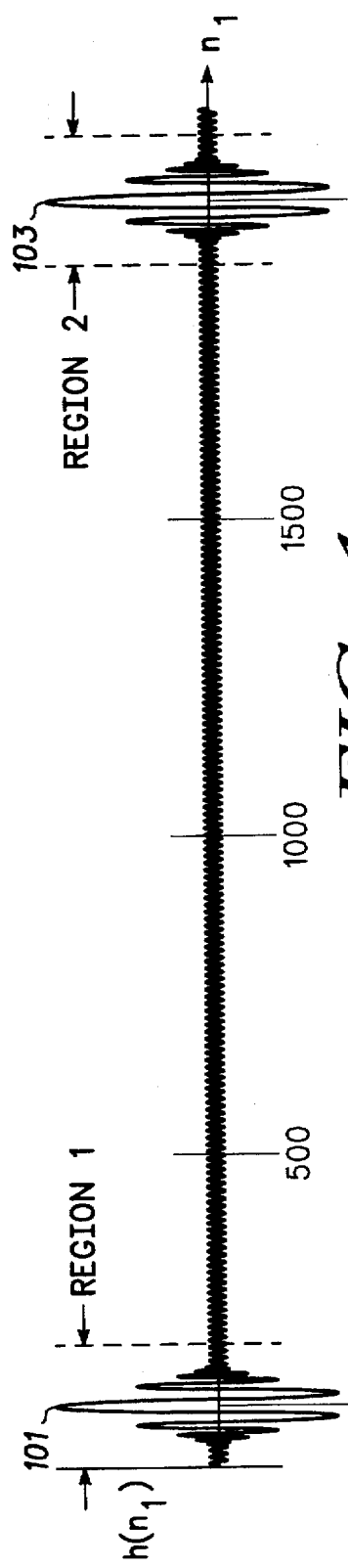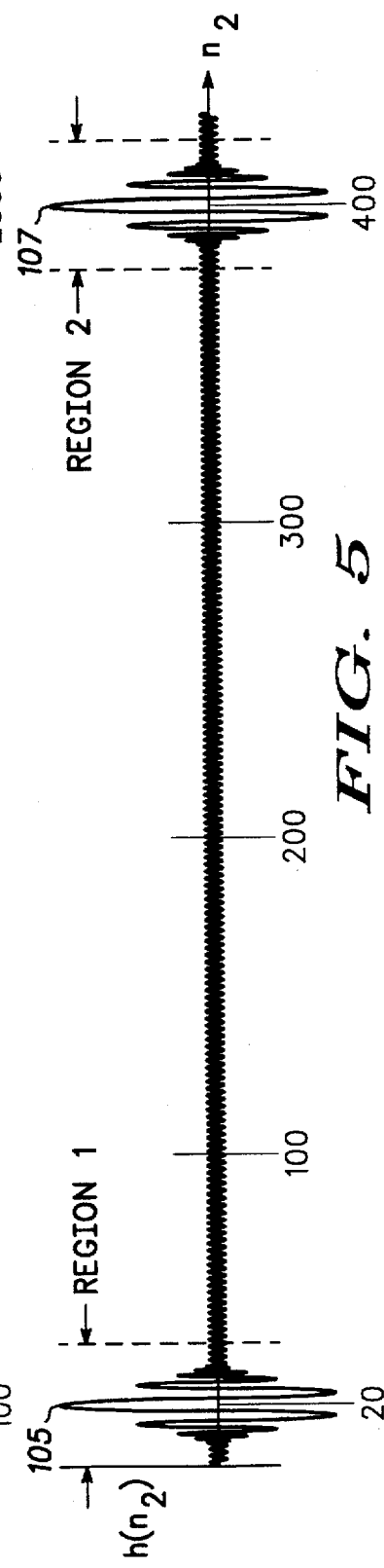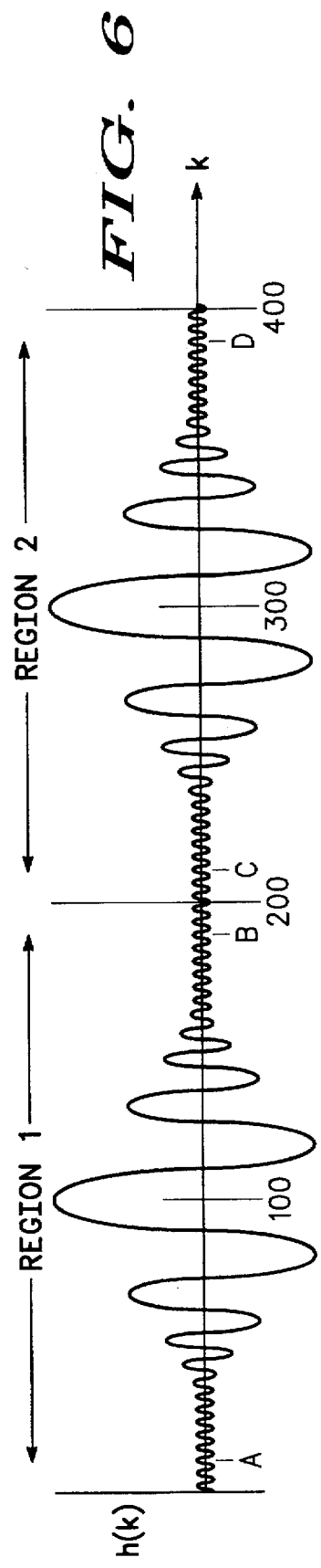

PARTITIONED ECHO CANCELER UTILIZING DECIMATION ECHO LOCATION

BACKGROUND OF THE INVENTION

This invention relates to echo cancelers and, in particular, to a partitioned echo canceler that utilizes decimation echo location for extending the tail length of an echo canceler without increasing the real time complexity and without significantly increasing convergence time of the echo canceler.

Echo cancelers are utilized in a variety of applications for canceling the effects of a reflected signal that results from the undesired coupling of a device's output signal (electrical or acoustic) back to its input signal path. Functionally, an echo canceler receives both the original reference signal and the reflected signal and attempts to approximate what the reflected signal will be from the original reference signal. The echo canceler then subtracts this approximated reflected signal from the actual reflected signal to obtain an error signal. Ideally, this error signal is zero if the echo canceler has successfully approximated the reflected signal and no reflected signal will be returned back to the transmitting source as desired.

Referring to FIG. 1, a configuration of a typical placement of an echo canceler in a telephony system whereby reference signal x(n) is transmitted to hybrid 12 and reflected signal r(n) is generated as a result of an impedance mismatch of hybrid 12. FIG. 1 illustrates a typical telephony system whereby a four-wire loop is converted to a two-wire line through hybrid 12. For purposes of illustration only, assume that a reference signal x(n) is transmitted from a transmitting source onto a four-wire loop and is received by hybrid 12. The hybrid 12 attempts to apply the signal onto the two-wire line and prohibit the transmitted signal from returning (as echo) on the receive path of the four-wire loop. However, in order for hybrid 12 to eliminate the effects of echo, the precise impedance of the two-wire line must be known. However, the impedance of a two-wire line can vary in different systems thereby causing a portion of the reference signal to be reflected by the hybrid back to the transmitting source. As a result, one cannot rely on the hybrid to provide greater than 6 dB of attenuation in the reflected signal. Additionally, long range delays, such as those occurring as a result of transmission delays, or other system effects, may present problems. Accordingly, it is desirable to place echo canceler 10 in the return loop from hybrid 12 back to the transmitting source to further attenuate or eliminate the affects of reflected signal r(n).

Referring to FIG. 2, a block diagram illustrating conventional components of an adaptive filter of echo canceler 10 of FIG. 1 is shown. Generally, echo canceler 10 receives reference signal x(n) and reflected signal r(n) and provides an error signal e(n) which is desirably zero if the echo canceler has accurately estimated what the reflected signal will be.

Echo canceler 10 includes L-tap delay first-in-first-out (FIFO) memory 16 for storing up to L samples of the reference signal. Echo canceler 10 also includes coefficient adaptation block 17 and coefficient bank 18 for storing L adaptive filter coefficients. Coefficient adaptation block 17 functions to update the value of the filter coefficients after each sample period according to well-known least-means square (LMS) calculations similar to one according to EQN. 10 which is shown hereinafter. Convolution block 20 is included for convolving the samples in L-tap FIFO 16 with the coefficients of bank 18. The result of the convolution represents an estimate of the reflected signal, e reference signal, then the error signal will desirably be zero.

An echo canceler typically includes additional components including a "near-end" signal detector and a non-linear processor such as an echo suppresser or a center clipper. However, the adaptive filter is the primary component within the echo canceler and is the subject of the present invention. Accordingly, it is the only component of an echo canceler that is illustrated. However, for purposes of completeness, echo canceler 10 may also include a process for monitoring the average power of the reference signal and the error signal such that when the adaptive filter has sufficiently converged, it enables a non-linear process to suppress any remaining reflected signal. Additionally, echo canceler 10 may also includes a "near-end" signal detector for monitoring the average power of the reference signal and the reflected signal to determine if the "near-end" signal is active whereby during such period, known as double-talk for voice signal, the adaptive filter coefficient block 17 is disabled to prevent divergence of coefficients- Also, any non-linear process would be disabled during active "near-end" signal conditions to allow the "near-end" signal to be passed.

An adaptive filter of a typical echo canceler contains L filter coefficients as represented by h(0), h(1) . . . h(L−1). The nth coefficient represents the finite impulse response echo model at time $nT_s$, where $T_s$ is the sample time. Accordingly, a conventional echo canceler can therefore model an echo impulse response with a tail length of time ($t_c$) as defined below in EQN. 1.

$$t_c = (L-1)T_s \qquad \text{EQN. 1}$$

However, a variety of circumstances, such as transmission delays and multiple echo path, may result in echo impulse response models that fall outside this limited time range of $t_c$. Additional filter taps will increase the tail length time but such additional filter taps will also increase the complexity and convergence time of the echo canceler. As a result, because of this increase in complexity, the number of filter coefficients, L, is typically limited in practical implementations.

Hence, a need exists for an improved echo canceler for extending the tail length time of an echo impulse response model without increasing the number of filter taps or the complexity and convergence time of the echo canceler.

BRIEF DESCRIPTION OF THE DRAWINGS

A more complete understanding of the present invention may be derived by referring to the detailed description and claims when considered in conjunction with the drawings, wherein like reference numbers refer to similar items throughout the drawings; and wherein FIG. 1 is a block diagram illustrating one possible use of the placement of an echo canceler in a telephony system;

FIG. 2 is a block diagram illustrating the components of an adaptive filter in a conventional echo canceler;

FIGS. 4–6 are graphical diagrams showing waveforms for illustrating the operation of the decimation echo location and partitioned echo canceler techniques of the present invention.

DETAILED DESCRIPTION OF THE DRAWINGS

Figure 3:
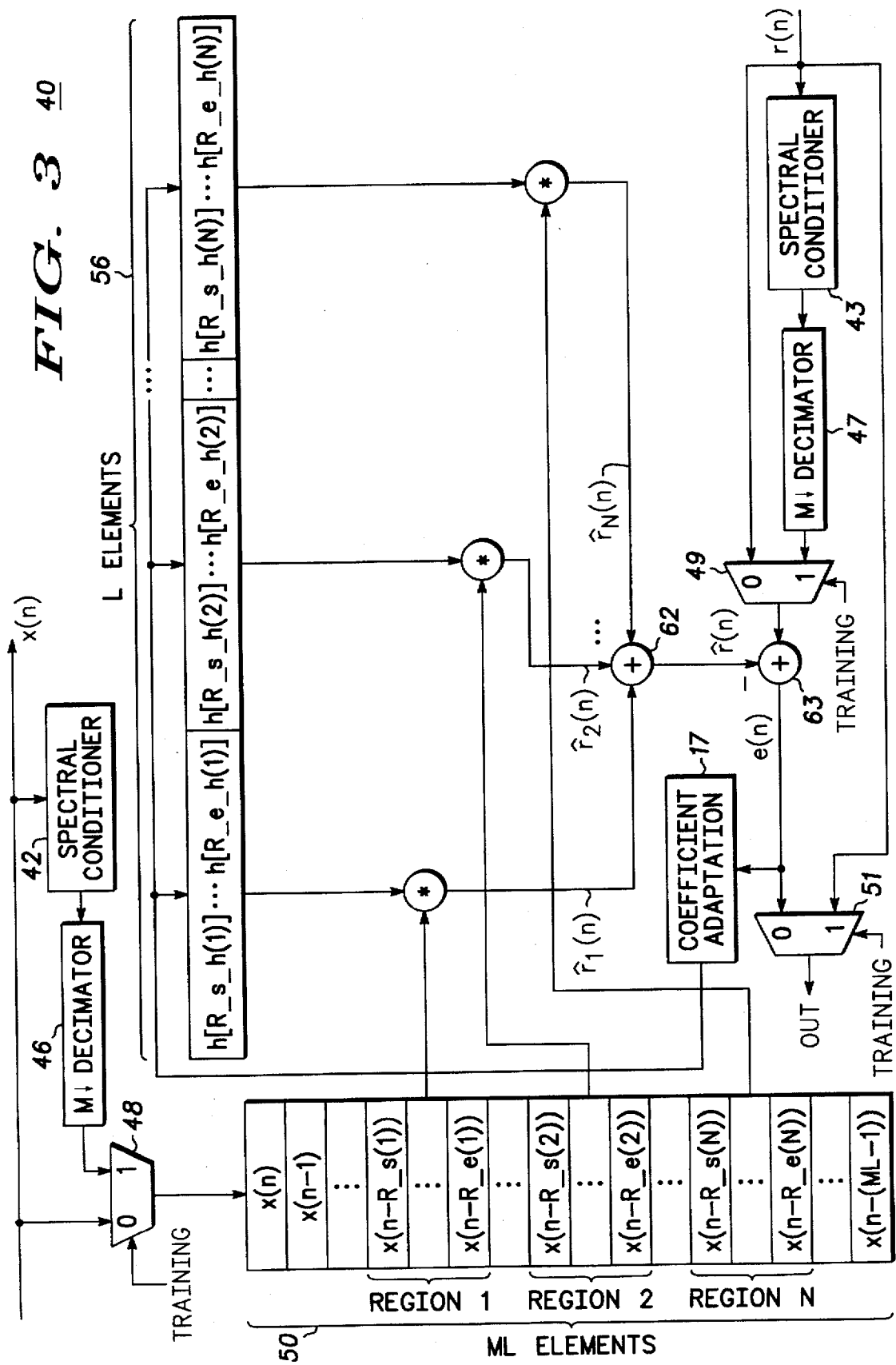
FIG. 3 is a detailed block diagram illustrating an adaptive filter for use in an echo canceler in accordance with the present invention.

The present invention solves the problem of limited tail length time in conventional echo cancelers. Accordingly, the present invention extends the tail length time of an echo canceler by a factor (decimation factor) of M without increasing the real time complexity or convergence time of the echo canceler. In particular, the present invention performs decimation on the reference and reflected signals to allow for passive Decimation Echo Location (DEL) to find the high energy regions of the echo impulse response model over an extended tail length time range ($t_{delpec}$) as given in EQN. 2.

$$t_{delpec} = (L-1) M \cdot T_s \qquad \text{EQN. 2}$$

where M is the decimation factor

The present invention then subdivides an L-tap adaptive filter to form a Partitioned Echo Canceler (PEC) where each partition corresponds to a high energy region identified during the DEL mode. The resulting echo canceler retains complexity and convergent rate characteristics that are equivalent or superior than those associated with a typical L-tap adaptive filter, but the resulting echo canceler has the extended tail length time range as given in EQN. 2.

As mentioned above, the present invention enhances adaptive filter techniques used in conventional echo cancelers by applying passive Decimation Echo Location (DEL) training to locate high energy echo model impulse response regions over an extended tail length time range, as given in EQN. 2. The present invention then enters a partitioned echo canceler (PEC) mode which segments the adaptive filter to address the high energy regions identified during the DEL training mode/sequence. The present invention further models the lower energy regions of the echo model impulse response to be zero. The present invention then accomplishes a substantial reduction in computation and memory space by performing convolution of only sample values of the reference signal, x(n), that occur within the identified high energy regions with corresponding adaptive filter coefficients to arrive at an overall estimate of the reflected signal. Accordingly, the present invention substantially reduces the number of required convolution multiply accumulate operations and coefficient update calculations as well the amount of memory required for storing adaptive filter coefficients.

Referring to FIG. 3, adaptive filter 40 is illustrated for use in an echo canceler in accordance with the present invention. Adaptive filter 40 includes memory block 50 for storing the received sampled values of the reference signal x(n). Adaptive filter 40 also includes adaptive filter coefficient block 56, which includes at least L elements, for storing L filter coefficients. Memory block 50, which includes at least ML elements, may be divided into a plurality of regions whereby regions 1 through N identify high energy regions associated with the echo model impulse response, as will be discussed in more detail below. It is understood that L is an integer number of coefficients in adaptive filter block 56 and M is typically an integer number representing the decimation factor. Non-integer M values are possible by combination interpolation/decimation process or other means. For purposes of the present invention, decimation may be more generally described as a resampling process whose final sampling period is greater than its original sampling period by a predetermined amount. Filter coefficient block 56 is similarly divided into a plurality of regions whereby there exists regions of block 56 corresponding to each one of the high energy echo impulse response filter coefficient regions identified during the DEL training. Adaptive filter 40 also includes convolution blocks 58_1 through 58_N for performing the necessary convolution for each of the N high energy regions, and the result of each individual convolution is summed, via adder 62, to arrive at the overall approximated reflected signal. The actual reflected signal is then subtracted from this approximated reflected signal, via adder 63 to provide the error signal, e(n), which desirably approaches zero based upon the performance of adaptive filter 40.

Upon startup, adaptive filter 40 enters a training mode where decimation echo location (DEL) is performed. At this time, the following signals are initialized as shown below.

Training=1

N=1

R_s(1)=0

R_e(1)=L−1

R_s_h(1)=0

R_e_h(1)=L−1 where R_s(1) and R_e(1) are used for denoting the starting and ending indices of high energy region 1 within the reference memory block 50, as shown in FIG. 3; and R_s_h(1) and R_e_h(1) are the starting and ending indices for the adaptive filter coefficients corresponding to such high energy region 1, as shown in FIG. 3.

In the DEL training mode, the reflected signal is passed as an output through multiplexer (MUX) 51 thereby avoiding sending decimated data as an output during the training mode. It is understood that in a system context, it may be desirable to apply a non-linear process to eleiminate this signal when the near-end signal is inactive.

Further, in the DEL training mode, the reference signal x(n) and the reflected signal r(n) are processed through spectral conditioners 42 and 43, respectively, for extracting and positioning the necessary spectral information. The signals are then decimated by a factor M by decimators 46 and 47. Accordingly, the adaptive filter is operating at a data rate (Fs_DEL) as given in EQN. 3 with a sample period ($T_s$_DEL) as defined in EQN. 4.

$$Fs\_DEL = Fs/M \qquad \text{EQN. 3}$$

$$Ts\_DEL = MTs \qquad \text{EQN. 4}$$

The advantage of training the adaptive filter at the new decimated rate is that the n-th filter coefficient now represents the finite impulse response echo model at time nTs_DEL. Accordingly, this extends the maximum tail length time by the decimation factor M, as shown in EQN. 2. The DEL mode trains on signals that have altered spectral components via spectral conditioners 42 and 43 as well as decimators 46 and 47. The spectral conditioning extracts and positions appropriate spectral regions to allow the adaptive filter to evolve in a manner representative of the results obtained if the original, non-decimated signals were used. Depending on the application, spectral conditioners 42 and 43 may take the form of a low pass filter having a cut-off frequency of Fs/2M. Alternately, spectral conditioners 42 and 43 may extract and position, in the baseband, a particular frequency range or results of a frequency sampling. Under certain conditions, the spectral conditioners could also be all-pass filters. Full convergence during training is not necessary to estimate the high energy regions of the filter, and training may be completed with a limited number of iterations.

When the DEL training is complete, the filter coefficients represent an estimate of the impulse response echo model over the extended tail length time range of MTs.

The high energy regions of the impulse response are then determined. This can be determined by a number of different energy estimating and peak searching techniques. For example, a technique may be utilized that searches for a high energy region around peak coefficient values. Alternately, a predetermined fixed number of samples positioned around a peak sample may be used to identify a high energy region.

Each of the N identified high energy regions are then mapped to the original non-decimated domain to define the start and end points of each region whereby the notation R_s(i) and R_e(i) are used to identify the starting and end points of high energy region i.

These points are used to select the appropriate delay regions of memory block 50 and are also used to calculate the filter partition pointers as shown in EQNs. 5 and 6.

$$R\_s\_h(1)=0 \qquad \text{EQN. 5}$$

$$R\_e\_h(1)=R\_e(1)-R\_s(1) \qquad \text{EQN. 6}$$

For i=2 to N, the remaining filter partition pointers are calculated as shown in EQNs. 7 and 8 whereby the starting pointer/indices for region i is one past the ending pointer of region i-1, while the ending pointer for region i is the starting pointer plus the size of the region.

$$R\_s\_h(i)=R\_e\_h(i-1)+1 \qquad \text{EQN. 7}$$

$$R\_e\_h(i)=R\_s\_h(i)+R\_e(i)-R\_s(i) \qquad \text{EQN. 8}$$

To model the extended time range as given in EQN. 2, a conventional echo canceler would need to form a convolution sum over the entire range as shown in EQN. 9.

$$\hat{r}(n) = \sum_{i=0}^{ML-1} h_n(i) \times (n-i) \qquad \text{EQN. 9}$$

This would require a total of ML multiply accumulate operations. Similarly, ML coefficients would need to be updated with a least mean squares (LMS) calculation as shown in EQN. 10 whereby the maximum stable adaptation gain (u) decreases for increasing L, thereby limiting the convergence rate.

$$\text{For } i=0; (ML-1) \; h_{n+1}(i)=h_n(i)+ue(n)x(i) \qquad \text{EQN. 10}$$

However, the present invention utilizes the fact that DEL training has identified important high energy regions of the filter coefficients whereby the other remaining coefficients may be modeled as zero. Therefore, memory block 50 may be partitioned, as shown in FIG. 3, into memory elements associated with regions 1 through N. Accordingly, convolution multiply accumulate as well as coefficient update operations associated with the memory elements modeled as zero need not be performed. Such a technique reduces the number of required multiply accumulate operations and coefficient update calculations to $L_{tot}$, as calculated in EQN. 11 whereby $L_{tot}$ is essentially the sum total of the number of coefficients in each of the high energy regions 1 through N.

$$L_{tot} = \sum_{i=1}^{N} (R\_e(i) - R\_s(i) + 1) \leq L \qquad \text{EQN. 11}$$

By partitioning the adaptive filter as described above, the convolution and coefficient update equations for the PEC system may be rewritten as shown in EQNs. 12 and 13, respectively.

$$\hat{r}(n) = \sum_{k=1}^{N} \sum_{i=0}^{R\_e(k)-R\_s(k)} h[i+R\_s\_h(k)] \times [n-i-R\_s(k)] \qquad \text{EQN. 12}$$

-continued $$\text{For } k = 1,N \qquad \text{EQN. 13}$$
$$\text{For } i = 0, R\_e(k) - R\_s(k)$$
$$h_{n+1}[i+R\_s\_h(k)]$$
$$= h_n[i+R\_s\_h(k)] + ue(n) \times [n-i-R\_s(k)]$$

Accordingly, the PEC system of the present invention is able to cover the extended tail length time range given in the EQN. 2 with only $L_{tot}$ convolution multiply accumulate operations and coefficient update calculations. In addition, the reduced number of non-zero coefficients allow for increased adaptation gain and a subsequent decrease in convergence time relative to a full-length conventional approach.

Referring to FIGS. 4-6, waveforms for illustrating an example of the operation of the Decimated Echo Location (DEL) and Partitioned Echo Canceler (PEC) techniques are shown. In this example, the number of coefficients, L, is fixed at 512. A typical application might have a sample rate of Fs=8000 Hz with a corresponding Ts=0.125 milliseconds (ms). Therefore, a conventional echo canceler could model an echo impulse response over a range of approximately 64 ms, as calculated according to EQN. 1. However, through the use of DEL/PEC techniques with a decimation factor (M) of 5, we can model echo over the extended range of approximately 320 ms, as calculated according to EQN. 2.

FIG. 4 illustrates the true (non-decimated) impulse response adaptive filter coefficients. As shown, a conventional approach would require over 2000 taps to model this response. However, as is often the case, the important high energy regions of the impulse response are concentrated over limited region(s). In this example, there are clearly N=2 important regions in the impulse response as indicated by Region 1 and Region 2 of FIG. 4 with respective peak values 101 and 103 occurring at n1=100 and n1=2000. These peak values correspond to times 12.5 ms and 250 ms. Through the use of DEL training, however, these important regions can be identified with a significantly reduced number of filter taps. Based on the results of the DEL training, partitioning of the echo canceler filter is performed to address only these regions of interest, thereby significantly increasing the range and efficiency of the fixed number of filter taps available.

FIG. 5 illustrates the impulse response obtained using decimated data during the DEL training mode in accordance with the present invention. Although only 512 taps are used, decimating by a factor of M=5 allows the impulse responses to be modeled over the extended range of approximately 320 ms. FIG. 4 is not the true impulse response given that the reference and reflected signals have been modified. However, as shown in the similarities between FIG. 4 and FIG. 5, proper spectral conditioning prior to decimation allows for the decimated model to evolve in a manner representative of the true impulse response.

The impulse response model created during the DEL training mode again clearly shows two important regions as represented by Region 1 and Region 2 of FIG. 5. By using a combination of peak searches, fixed windowing, or variable window sizes based on energy region calculations, the region boundaries can be determined. FIG. 5 shows that Region 1 has a peak value 105 occurring at n2=20 and extends primarily over the (decimated) coefficient range of 0 to 40, and Region 2 has a peak value 107 occurring at n2=400 and extends over the (decimated) coefficient range 380 to 420.

Given that the impulse response of FIG. 5 was generated from decimated data, the identified high energy regions must be mapped to the original (non-decimated) domain. Therefore the true (non-decimated) range of Region 1 is 0 to 200, and Region 2 is 1900 to 2100. These ranges correspond with our initial visual inspection of FIG. 4, and illustrate how DEL training can be used to identify regions of interest over an extended range.

The results of the DEL training and the identification of these high energy regions can now be used to partition the echo canceler. In FIG. 3, the reference memory block 50 operates as a FIFO buffer. Therefore, the entire extended range (ML) must be maintained, although at any point in time only the data in the regions of interest will be utilized. Therefore we can calculate the reference data indices directly from the region boundaries. Continuing with our example, the starting and ending points for the regions 1 and 2 are as follows.

$R\_s(1)=0$
$R\_e(1)=200$
$R\_s(2)=1900$
$R\_e(2)=2100$

Operating the filter in a partitioned mode assumes that coefficients outside the regions of interest are to be modeled as zero, and therefore, do not contribute to the echo cancellation. As such, it is only necessary to maintain L elements as shown in the FIG. 3 filter coefficient memory block 56.

FIG. 6 illustrates how the partitioned filter coefficient memory block contains several sections, each one modeling an important region of the impulse response. Basically, the partitioned coefficient memory block contains the coefficients associated with each high energy region grouped serially and adjacent to each other, as shown in FIG. 6. All intermediate coefficients are modeled as zero and, thus, may be discarded. The indices used to access the coefficient memory block can be calculated in a straightforward manner, as given in EQNs. 5–8, whereby reference letters A and B denote the starting and ending indices for high energy region block 1 and reference letters C and D denote the starting and ending indices for high energy region block 2.

$A=R\_s\_h(1)=0$
$B=R\_e\_h(1)=(200-0)=200$
$C=R\_s\_h(2)=200+1=201$
$D=R\_e\_h(2)=201+(2100-1900)=401$

These coefficients, along with their respective x(n) sample counterparts stored in reference memory block 50, are the only ones that are used to convolve the reference signal, x(n), with the impulse response, h(n), to generate the estimated reflected signal ulate operations and coefficient update calculations to $L_{tot}$, as calculated in EQN. 11.

By now it should be apparent that the present invention has provided a novel adaptive filter within an echo canceler. The adaptive filter operates in a first mode for performing decimation echo location (DEL). During the DEL mode, echo cancellation is modeled over an extended range using decimated data, and then high energy regions occurring within the echo impulse response are identified. The adaptive filter then operates in a second mode for performing partitioned echo cancellation (PEC). During the PEC mode, the identified high energy region filter coefficients of the impulse response are partitioned and convolution of the reference signal with the impulse response signal is accomplished by performing convolution on only those samples in the reference signal memory block that correspond to respective high energy region filter coefficients in the impulse response signal. Filter coefficients not associated with these high energy regions are modeled as zero and, thus, any associated calculations therewith may be neglected. Accordingly, the adaptive filter of the present invention extends the tail length time range of conventional adaptive filters while not increasing the number of required filter coefficient taps and substantially reduces the number of convolution operations and coefficient update calculations.

While the invention has been described in conjunction with specific embodiments thereof, many alternatives, modifications and variations will be apparent to those of ordinary skill in the art in light of the foregoing description. Accordingly, the invention is intended to embrace all such alternatives, modifications and variations as fall within the broad scope of the appended claims.

We claim:

1. A method for performing echo cancellation whereby echo denotes a portion of a reference signal appearing on an output signal path being coupled back to an input signal path thereby generating a reflected signal and resulting in echo, the method comprising the steps of:

entering a training mode comprising the steps of:
      performing spectral conditioning on each incoming sample of both the reference and reflected signals;
      decimating both the reference and reflected signal thereby extending the time range that can be modeled by the adaptive filter;
      allowing the adaptive filter to operate on the decimated reference and reflected signals thereby obtaining a model representative of an echo impulse response over the time range;
      identifying high energy regions within the echo impulse response;
      mapping the high energy regions of the echo impulse response in the decimated domain to corresponding regions in the non-decimated domain;
      partitioning respective samples of the reference signal that correspond to the high energy regions of the impulse response signal;
   exiting the training mode and entering a partitioned mode, comprising the step of:
      performing convolution on only samples of the reference signal and the echo impulse response that correspond to the high energy regions of the echo impulse response to generate an estimated reflected signal and thereby reduce the number of coefficient taps required to perform echo cancellation over the time range and reduce the number of convolution multiply accumulate operations required for convoluting the reference signal with the reflected signal.

2. The method of claim 1 further including the step of performing adaptive filter coefficient updates on only corresponding to the high energy regions thereby reducing a total number of coefficient update calculations required.

3. The method of claim 1 further including the step of subtracting said estimated reflected signal from the reflected signal to generate an error signal which desirably approaches zero.

4. An adaptive filter for use in performing echo cancellation functions, the adaptive filter being responsive to a reference signal appearing on a signal path and a reflected signal whereby the reflected signal represents a portion of the reference signal that is reflected back onto the signal path thereby generating the reflected signal and resulting in echo, the adaptive filter functioning to make the reflected signal substantially equal to zero, the adaptive filter comprising:

a reference signal memory block for storing samples of the reference signal;
   an adaptive filter coefficient block for storing adaptive filter coefficients;
   a first decimator, responsive to the reference signal, for supplying a decimated version of the reference signal;
   a first multiplexer having an output for alternately supplying the reference signal and the decimated version of the reference signal to the reference signal memory block;

a plurality of convolution circuits for performing convolution of the samples associated with high energy regions of the echo impulse response with corresponding samples of the reference signal;

a first summer for summing the result of each of the plurality of convolution circuits thereby providing an output representing an estimate of the reflected signal a second decimator, responsive to the reflected signal, for supplying a decimated version of the reflected signal;

a second multiplexer having an output for alternately supplying the reflected signal and the decimated version of the reflected signal to an output of the second multiplexer;

a second summer for subtracting the estimate of the reflected signal appearing at the output of the first summer from the output of the second multiplexer thereby providing an output representing an error signal;

wherein the adaptive filter operates in a first mode whereby the first multiplexer provides the decimated version of the reference signal to the reference signal memory block and whereby the second multiplexer provides the decimated version of the reflected signal to the second summer and the adaptive filter operates on the decimated versions to obtain an echo impulse response thereby extending the time range of the echo impulse response that can be modeled by the adaptive filter;

wherein high energy regions of the echo impulse response and corresponding samples within the reference signal memory block are identified; and wherein the adaptive filter operates in a second mode whereby echo cancellation functions are implemented by performing convolution on only samples of the reference signal and the echo impulse response reflected signal that correspond to the high energy regions of the echo impulse response thereby reducing the number of coefficient taps required to perform echo cancellation over the time range and reducing the number of multiply accumulate operations required for convolving the reference signal with the echo impulse response and thereby reducing the number of coefficient update calculations.

5. The adaptive filter of claim 4 further including a third multiplexer for alternatley supplying the reflected siganl or the output of the second summer to an output of the adaptive filter.

6. The adaptive filter of claim 4 further including a coefficient adaptation block, coupled between the output of the second summer and the adaptive filter coefficient block for updating the values of the adaptive filter coefficients.

7. The adaptive filter of claim 4 further including a first spectral conditioner for processing the reference signal, said first spectral conditioner having an input coupled for receiving the reference signal and an output coupled to the first decimator; and a second spectral conditioner for processing the reflected signal, said second spectral conditioner having an input coupled for receiving the reflected signal and an output coupled to the second decimator.

8. A method for extending the time range of an impulse response of an adaptive filter during a training sequence for the purpose of identifying high energy regions of an impulse response over an extended time range, the adaptive filter being responsive to first and second signals, the method comprising the steps of:

entering a training sequence for:

performing spectral conditioning on each incoming sample of both the first and second signals whereby said spectral conditioning alters a power density of said first and second signals for identifying high energy regions;

decimating both the first and second signals by a predetermined factor; and allowing the adaptive filter to operate on the decimated first and second signals thereby obtaining an impulse response for the adaptive filter over a time range that is longer in time, by the predetermined factor, than a corresponding time range if the adaptive filter were operating on non-decimated versions of the first and second signals.

* * * * *